United States Patent [19]

Hornagold

[11] B 3,990,714

[45] Nov. 9, 1976

[54] SELF-STORING OUTRIGGER FLOAT ASSEMBLY

[75] Inventor: John T. Hornagold, Arden Hills, Minn.

[73] Assignee: American Hoist & Derrick Company, St. Paul, Minn.

[22] Filed: June 2, 1975

[21] Appl. No.: 583,051

[44] Published under the second Trial Voluntary Protest Program on February 3, 1976 as document No. B 583,051.

[52] U.S. Cl. .................................. 280/765; 212/145
[51] Int. Cl.² ............................................ B60S 9/02
[58] Field of Search ................. 280/150.5; 212/145

[56] References Cited

UNITED STATES PATENTS

| | | | |
|---|---|---|---|
| 3,007,717 | 11/1961 | Noly | 280/150.5 |
| 3,396,854 | 8/1968 | Crisp | 212/145 |
| 3,743,108 | 7/1973 | Visser | 280/150.5 |
| 3,754,777 | 8/1973 | Riggs | 280/150.5 |
| 3,843,154 | 10/1974 | Thompson | 280/150.5 |
| 3,901,532 | 8/1975 | Hornagold | 280/150.5 |

FOREIGN PATENTS OR APPLICATIONS

| | | |
|---|---|---|
| 1,592,893 | 6/1970 | France |

*Primary Examiner*—Robert R. Song
*Attorney, Agent, or Firm*—Burd, Braddock & Bartz

[57] ABSTRACT

An outrigger assembly for stabilization of a load handling machine such as a truck crane. An outrigger beam is horizontally extensible from the vehicle to a working position and retractible to a storage position. A float assembly is located on the beam end and has a float pad vertically extensible and retractible relative to the beam end by means of a hydraulic power unit enabling the float pad to be positioned in stabilizing engagement with the ground. The float pad is rotatable with respect to the beam end between a generally horizontal working orientation and a generally vertical storage and transport orientation adjacent the structure. During extension and retraction of the outrigger beam, the float pad is maintained in the horizontal, less obtrusive, position for clearance of ground obstacles. An actuator is mounted on the vehicle to contact a part of the float assembly as it approaches the vehicle. Just as the float assembly approaches a fully retracted position, the actuator contacts the float assembly part to rotate the float pad to the vertical position upon final retraction of the assembly. As soon as the float pad is again extended vertically or horizontally, it moves to the horizontal orientation.

13 Claims, 8 Drawing Figures

SELF-STORING OUTRIGGER FLOAT ASSEMBLY

BACKGROUND OF THE INVENTION

Certain utility vehicles are typically equipped with a plurality of extensible and retractible outrigger assemblies usable for maintenance of stability of the vehicle and prevention of tipping while performing a work function. Notably, such vehicles include truck cranes which should be sufficiently narrow to safely traverse the highway en route to a work site. For example, see U.S. Pat. No. 3,279,622 to Person issued October 12, 1966. The extensible outrigger assemblies provide an enlarged pedestal of stability for the working vehicle at the work site. Usually two outrigger assemblies are provided on each side of the vehicle having outrigger beams which extend substantially outward from the side of the vehicle.

A float assembly is located at the outer end of the outrigger beam. The float assembly has a vertically extendible and retractible plate-like foot for engagement with the ground, known in the art as a float or a float pad. Vertical extension and retraction of the float pad is generally accomplished by means of a hydraulic power unit.

Float pads desirably have a large surface area for stable engagement with soft ground and the like. The float pads are extendible outward from the outrigger beam where they are disposed in a horizontal, working orientation. With the outrigger beams retracted in a storage position, as for travel of the vehicle, it is impractical to carry them in the horizontal orientation. They must either be removed, which is burdensome, or, as is frequently the case, they are stored adjacent the vehicle side in a generally vertical orientation. To accomplish the latter, the float pad must be pivotally affixed relative to the outrigger beam for rotation between the horizontal and vertical orientations.

Extension of the outrigger beam to the working position with the float pad in the vertical position poses difficulty, as the lower edge of the float pad closest the ground encounters obstacles which can inhibit or damage the outrigger assembly. It has been proposed to spring mount the float pad relative to the rod of the hydraulic motor, such that the outrigger beam is extended with the float pad vertically disposed, and when the float pad encounters an obstacle, it yields to the obstacle against the bias of the spring, returning to the vertical position after clearing the obstacle. A cam mechanism on the float assembly coacts with an actuator on the beam end to rotate the float pad to the horizontal orientation as the rod is downwardly extended toward the ground. It would be desirable to provide an outrigger assembly having a float pad which remains in the horizontal orientation during extension and retraction of the outrigger beam and which coacts with an actuator mounted on the outrigger housing to be tilted to the vertical, storage orientation just as the outrigger is fully retracted.

SUMMARY OF THE INVENTION

The invention relates generally to an outrigger assembly of the type described and in particular to a float assembly for such an outrigger assembly. An outrigger beam is horizontally extensible and retractible relative to an outrigger housing mounted on machine structure. A float assembly mounted on the outward end of the outrigger beam has a float pad fixed on a rod which is vertically extendible and retractible for stabilizing engagement of the ground by the float pad. The float pad is self-storing when the outrigger beam is fully, horizontally retracted, and the float pad is fully, vertically retracted. The float pad is rotatable with respect to the beam end between a horizontal, working position for engagement of the ground, and a vertical storage position adjacent the machine structure for storage as when in transport.

During extension and retraction of the outrigger beam, the float pad is maintained in the horizontal orientation whereby ground obstacles which would otherwise present difficulty if the pad were vertically orientated are easily cleared as the float pad travels to its intended, working location.

An actuator mounted on the machinery structure is purposefully designed and positioned to coact with the float assembly to cause rotation of the float pad from the horizontal to the vertical position as the outrigger beam finally moves toward the fully retracted position and as the float pad finally moves toward the fully, vertically retracted position, As the float pad approaches the fully retracted position, moving either horizontally or vertically, or both, the actuator contacts a part of the float pad to cause rotation of the float pad contemporaneous with further retraction such that when the float pad is finally fully retracted, it is also fully rotated to the vertical, stored position. The actuator permits rotation of the float pad from the vertical toward the horizontal orientation upon commencement of horizontal extension of the outrigger beam or vertical extension of the float pad, or both. Rotation of the float pad between positions occurs only proximate the machine structure where ground obstacles are not a problem.

IN THE DRAWINGS

DESCRIPTION OF PREFERRED EMBODIMENT

Figure 1:
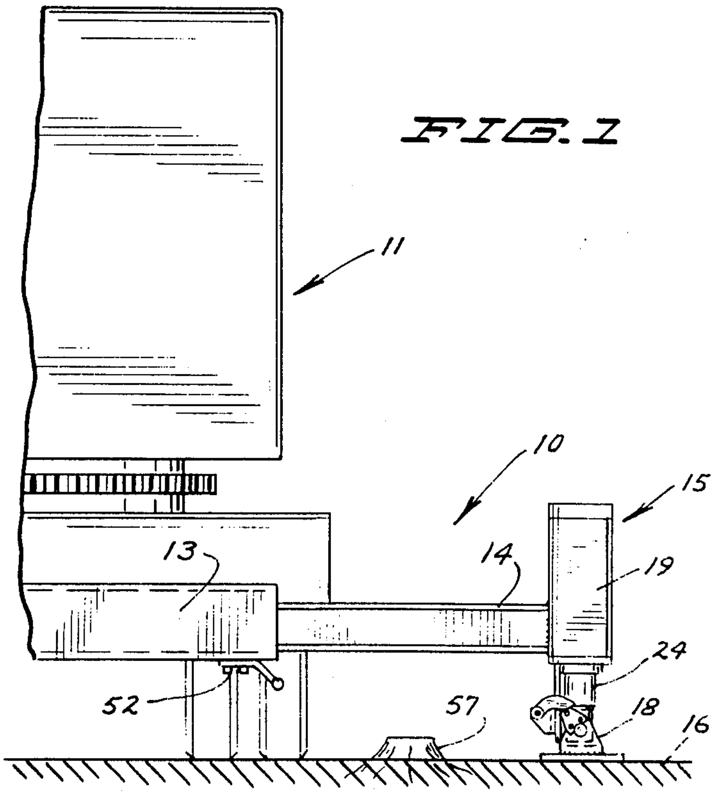
FIG. 1 is a rear elevational view of part of a load handling machine having an outrigger assembly according to the present invention in an outwardly extended position and in stabilizing engagement with the ground.

In FIGS. 1 through 8, an outrigger assembly 10 is installed on the rear of a work vehicle partially shown as a truck crane 11 in FIG. 1. Outrigger assembly 10 is also applicable to other equipment requiring stabilization such as a fire fighting vehicle having long extendible members, power line maintenance trucks with extendible booms, and the like. Truck crane 11 requires stabilization in the lifting and handling of loads and in the performance of like work normally associated with a truck crane. Typically four outrigger assemblies are symmetrically installed on the truck crane, two on each side, one pair toward the front of the vehicle and one pair toward the rear.

Outrigger assembly 10 includes an elongate, horizontally disposed transverse box housing 13 installed on truck crane 11. An outrigger beam 14 is telescopically engaged in housing 13, and is extendible and retractible relative thereto. Suitable and usual means are provided to effect extension and retraction of outrigger beam 14 relative to housing 13 such as hydraulic motors (not shown). Outrigger beam 14 can be a single section beam, as shown, or a multiple, telescoping section beam as is known in the art.

Figures 3, 4, 5:
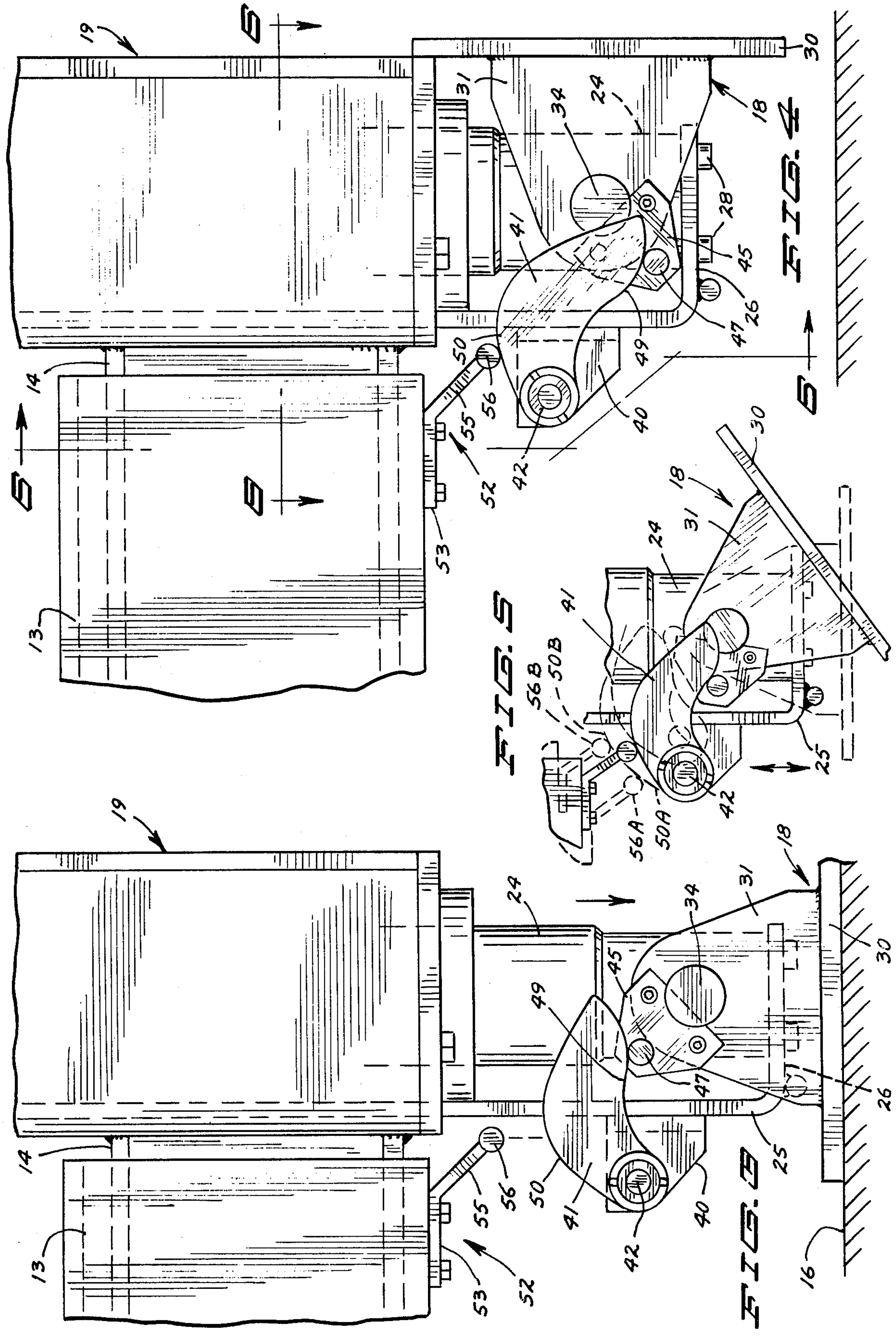
FIG. 3 is an enlarged side elevational view of part of the outrigger assembly of FIG. 2 with the outrigger beam retracted and the float pad vertically extended.
FIG. 4 is an enlarged side elevational view of part of the outrigger assembly of FIG. 2 with the outrigger beam retracted and the float pad vertically retracted and moved to a storage position.
FIG. 5 is a side elevational view detailing the tilt mechanism operation of the tilt assembly of the outrigger assemblies of FIGS. 1 through 4.

A float assembly 15 is fixed to the outer end of outrigger beam 14 for extension and retraction therewith relative to the housing 13 and thereby also relative to truck crane 11. Float assembly 15 is movable with the end of beam 14 to an outwardly extended working position as shown in FIG. 1, and to a retracted position of storage as shown in FIG. 4. Float assembly 15 is used in the extended, working position in engagement with the ground 16 to provide an added measure of stability and safety to truck crane 11 during the performance of work. In the stored position of FIG. 4, outrigger beam 14 and float assembly 15 are out of the way for movement of the truck crane to another work site or during the performance of light work wherein added stabilization is not necessary.

Figure 8:
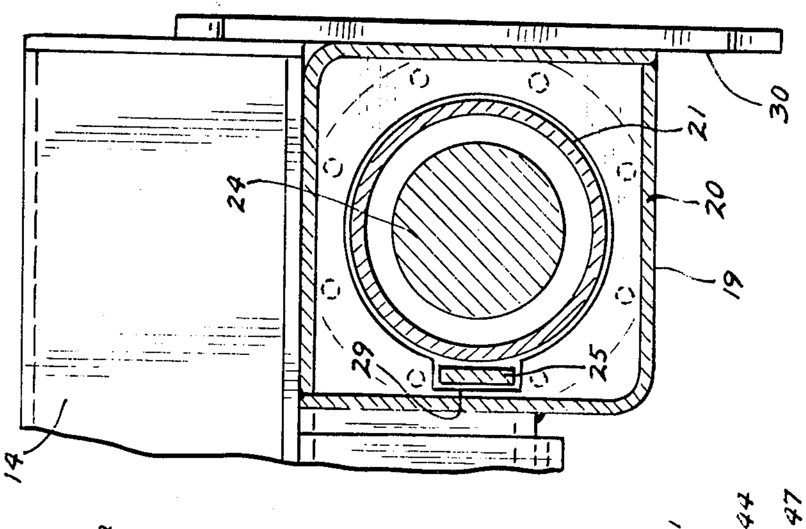
FIG. 8 is a sectional view of the outrigger assembly as shown in FIG. 4 taken along the line 8—8 thereof.
Figure 7:
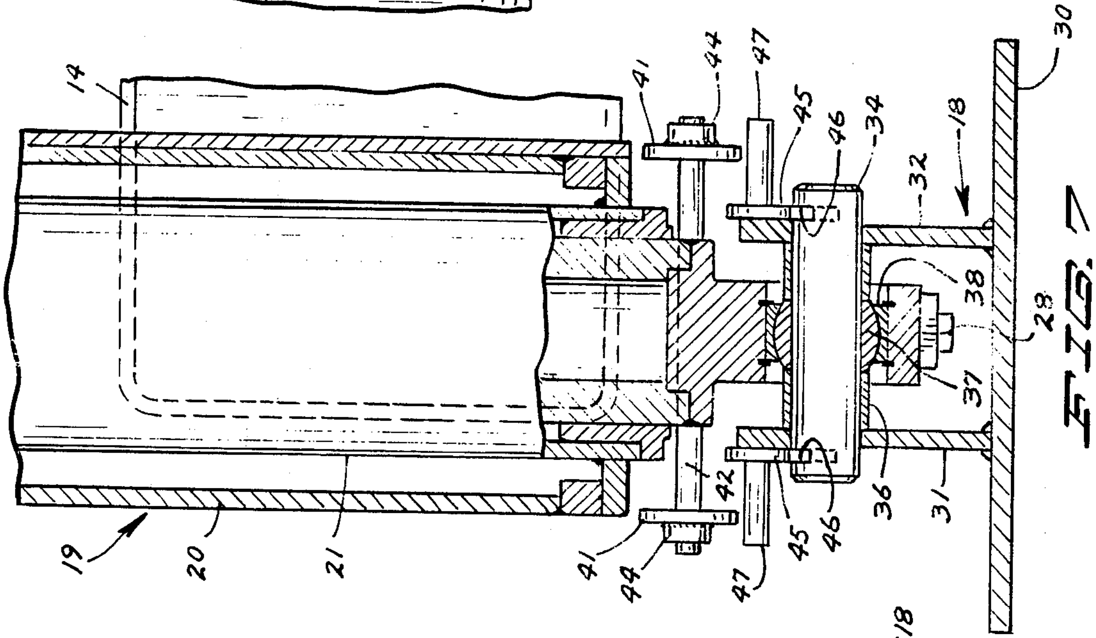
FIG. 7 is a sectional view of the outrigger assembly as shown in FIG. 2 taken along the line 7—7 thereof.

Float assembly 15 includes a float pad 18 operably assembled to a hydraulic power unit 19 for vertical extension and retraction. As shown in FIGS. 7 and 8, hydraulic power unit 19 includes a casing 20 firmly affixed to the end of outrigger beam 14 and securely containing a vertically disposed hydraulic cylinder 21. A piston (not shown) is movably located in hydraulic cylinder 21 for linear, vertical movement therein in conventional fashion. A support leg or rod 24 is connected to the piston and extends downwardly outward from hydraulic cylinder 21. A vertical guide bar 25 has a horizontal end section 26 which is secured to the lower end of rod 24 as by bolts 28 (see FIGS. 4 and 7). Guide bar 25 extends upwardly, parallel to rod 24, and is accommodated in a groove 29 adjacent hydraulic cylinder 21. The purpose of guide bar 25 is to restrain the piston and rod 24 from rotation about an upright axis with respect to hydraulic cylinder 21.

Figure 6:
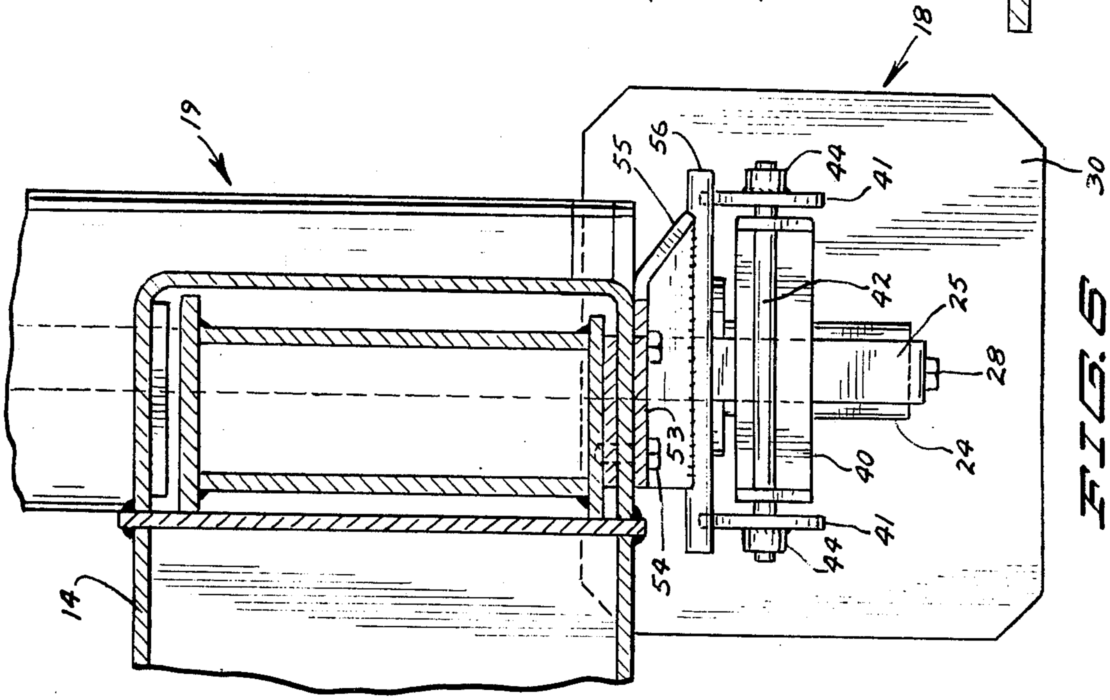
FIG. 6 is a sectional view of the outrigger assembly shown in FIG. 4 taken along the line 6—6 thereof.

Float pad 18 is connected to the lower end of rod 24 for vertical extension and retraction with rod 24 to engage and disengage ground 16. Float pad 18 is pivotally connected to rod 24 for rotation about a horizontal axis between a ground engageable, generally horizontal orientation of FIGS. 3 and 7, and a generally vertical orientation for storage as shown in FIGS. 4 and 6. Float pad 18 includes a flat, plate-like foot or base 30 and a pair of parallel, symmetrical side plates 31, 32 connected to base 30 and extending perpendicular from the plane of base 30. A float pivot pin 34 passes through suitably provided holes in the side plates 31, 32 and through a suitable opening of rod 24 proximate the end thereof. Float pad 18 is pivotal about the axis of pivot pin 34 relative to rod 24.

Float pad 18 is assembled to rod 24 for limited rotational movement on horizontal axes in all directions to compensate for ground irregularities. As shown in FIG. 7, a conventional ball bushing 36 surrounds and is secured to float pivot pin 34 between side plates 31, 32, and has an enlarged ball portion 37. Rod 24 has a socket assembly 38 which movably accommodates ball portion 37 of ball bushing 36, thus to allow the desired, limited movement.

Outrigger assembly 10 includes a tilt mechanism operable to cause movement of float pad 18 from the generally horizontal orientation to the generally vertical orientation upon retraction of the outrigger assembly to the storage location, and likewise to permit movement of float pad 18 from the vertical, storage orientation to the horizontal, working orientation upon initial, partial extension of the outrigger assembly. Movement from the horizontal to the vertical orientation is accomplished upon final retraction, either sequentially or simultaneously, of outrigger beam 14 relative to outrigger housing 13, and rod 24 relative to hydraulic cylinder 21. In similar fashion, rotation from the vertical, storage position to the horizontal, working position is initiated just as soon as either extension of outrigger beam 14 from outrigger housing 13 is commenced, or as extension of rod 24 from hydraulic cylinder 21 is commenced. Complete rotation to the horizontal, working position is accomplished soon after a partial extension of the float pad 18 either vertically downward or horizontally outward. Rotation between the positions is accomplished automatically without manual assistance from the crane operator or ground personnel.

As shown in FIGS. 3, 4 and 6, a transverse cam bracket 40 is mounted on guide bar 25 facing truck crane 11. A pair of cam members 41, 41 are pivotally disposed proximate opposite ends of a cam pivot pin 42 carried by cam bracket 40. Nuts 44, 44 secured to opposite ends of cam pivot pin 42 serve to maintain cam members 41, 41 assembled to pin 42. Cam pivot pin 42 is parallel to float pivot pin 34.

A pair of float actuator brackets 45, 45 are secured to the float pivot pin 34. As shown in FIG. 7, float actuator brackets 45, 45 are securely fitted in slots 46, 46 provided near the ends of float pivot pin 34 just outboard of side plates 31, 32 on float pad 18. Float actuator brackets 45, 45 are secured to float pivot pin 34 for rotation of float pivot pin 34 upon rotation of the float actuator brackets.

A float actuator bar 47 is integral with each float actuator bracket 45 and extends outward therefrom parallel to cam pivot pin 42 in position for contact by cam member 41. Cam member 41 rests on float actuator 47 under the influence of its own weight and has a first cam surface or leading edge 50 extending generally upward from cam pivot pin 42 and sloping in a direction away from outrigger housing 13. As shown in FIG. 3, with float pad 18 in the horizontal orientation, cam member 41 has a lower second cam surface or lower edge portion 49 extending rearward from cam pivot pin 42 and in engagement with the float actuator bar 47 of a corresponding float actuator bracket 45.

Figure 2:
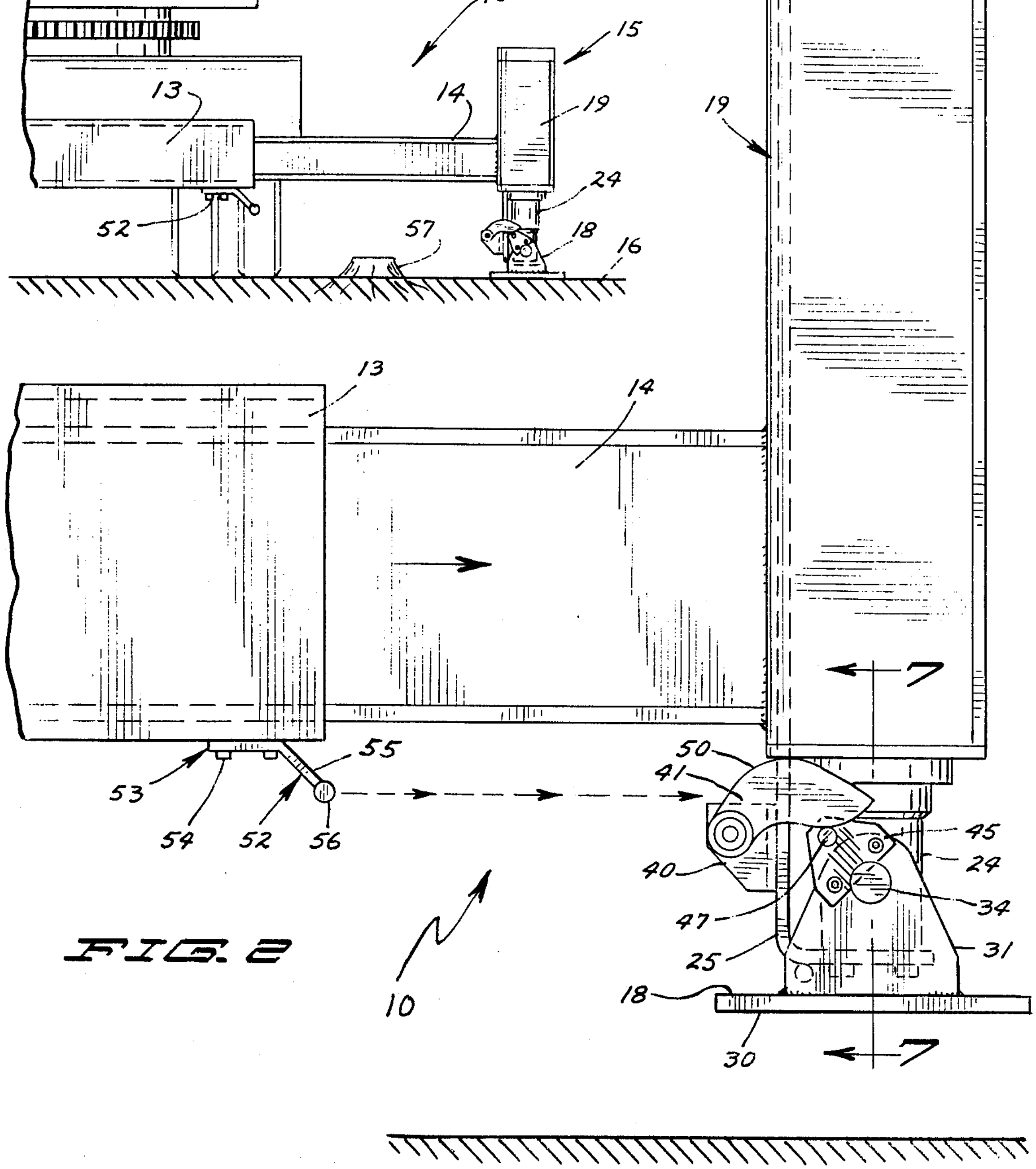
FIG. 2 is an enlarged side elevational view of the outrigger assembly of FIG. 1 having an outrigger housing partially shown, an outrigger beam partially extended, and a float pad vertically retracted.

A cam actuator 52 is mounted on the lower wall of outrigger housing 13, as shown in FIGS. 2 and 3, having a base plate 53 adjustably secured to outrigger housing 13 as by bolts 54. An arm 55 extends outward and downward from base plate 53, terminating at a transverse, cam actuator bar 56. Cam actuator bar 56 is positioned to contact the leading edges 50 of the cam members 41, 41 as float assembly 15 and float pad 18 are retracted to the storage location. Cam actuator bar 56 has a transverse dimension sufficient to contact both cam members 41 simultaneously, and is positioned to make such contact whether the float pad 18 approaches from a horizontal direction or a vertical direction, or both.

Float assembly 15 is usable in the extended configuration of FIG. 1 to provide maximum stability, or in the configuration of FIG. 3 with the outrigger beam 14 retracted as when space is not available to permit extension thereof. Considering the configuration of FIGS. 1 and 2, float assembly 15 is extended outward on the end of outrigger beam 14 relative to outrigger housing 13. The float pad is in the vertically retracted position whereby ground obstacles, such as a tree trunk stump 57, shown in FIG. 1, are cleared. Once the desired, outwardly extended configuration is reached, hydraulic power unit 19 is operated to lower the float pad 18 to engagement with the ground 16, as shown in FIG. 1. To store the float pad 18 after completion of the work, the hydraulic power unit is operated to raise the float pad 18 to the position of FIG. 2. Thereupon, retraction of outrigger beam 14 into housing 13 is commenced. The cam actuator bar 56 is in horizontal alignment with a portion of the leading edge 50 of the cam members 41, as indicated in FIG. 2. During this retraction, float pad 18 is in the horizontal orientation thus to clear ground obstacles. As outrigger beam 14 approaches a fully retracted position, cam actuator bar, as shown in phantom at 56A in FIG. 5, contacts the leading edge, shown at 50A, of cam member 41. Although only one cam member 41 can be seen in FIG. 5, both are contacted and move identically. Upon further retraction, cam actuator bar 56 rides over the leading edge 50 of cam member 41 forcing rotation of cam member 41 downwardly or clockwise as viewed in FIG. 5. The lower edge portion 49 of cam member 41 bears against float actuator bar 47 forcing it to rotate with float pivot pin 34 in a direction of rotation opposite to that of cam member 41. This causes rotation of float pivot pin 34 and thus float pad 18. As shown in full lines in FIG. 5, float pad 18 commences rotation toward the vertical orientation upon further retraction of outrigger beam 14 into outrigger housing 13. The amount of retraction of outrigger beam 14 into outrigger housing 13 to accomplish full retraction corresponds to the distance required for actuator bar 56 to ride over the leading edge 50 of cam member 41 sufficient to accomplish a 90° rotation of float pad 18 to the vertical orientation shown in FIG. 4. When the outrigger beam 14 is again extended relative to outrigger housing 13, immediately upon such extension the float pad 18 begins rotation toward the horizontal orientation. After only a partial extension of outrigger beam 14, the float pad 18 is completely rotated to the horizontal orientation for extension to a working location.

Considering FIG. 3, float assembly 15 is usable to stabilize truck crane 11 when outrigger beam 14 is retracted simply by vertical, downward extension of rod 24 to a point where float pad 18 engages the ground, as shown. Float assembly 15 is usable in such a configuration when space does not permit extension of outrigger beam 14 or when stability requirements are insufficient to warrant extension of the outrigger beam. The float pad 18 is automatically stored upon vertical retraction of rod 24. Cam actuator bar 56 is in vertical alignment with the leading edge 50 of cam member 41. Upon retraction of rod 24, as it approaches a fully retracted position, the cam actuator bar, as indicated at 56B in FIG. 5, makes contact with the leading edge of the cam member, indicated at 50B in FIG. 5. Upon further retraction of rod 24 toward a fully retracted position, rotation of the float pad 18 towards the vertical orientation for storage commences, as shown in full lines in FIG. 5. As retraction of rod 24 proceeds, cam actuator bar 56 rides over the leading edge 50 of cam member 41 until the vertical, storage orientation of FIG. 4 is reached upon full retraction of the rod 24. Immediately upon extension of rod 24 again, rotation of float pad 18 toward the horizontal orientation commences and is complete after a partial extension of rod 24.

Leading edge 50 of cam member 41 is suitably contoured whereby rotation of the float pad 18 to the vertical orientation is forced as the float pad approaches the cam actuator 52 from either a horizontal or a vertical direction. Cam actuator bar 56 is aligned with leading edge 50 when either vertically or horizontally displaced from it. Rotation of the float pad is forced by retracting movement in either the vertical or horizontal direction and is automatically accomplished upon full retraction.

The embodiments of the invention in which an exclusive property or privilege is claimed are defined as follows:

1. An outrigger assembly for stabilization of a vehicle including:

an elongate, substantially horizontal outrigger beam mounted for generally horizontal movement between a first, horizontally retracted position and a second, horizontally extended position relative to said vehicle;

a float assembly mounted on an outer end of said beam;

said float assembly including a float pad support leg, a float pad rotatably assembled at the lower end of the support leg to be movable between a generally horizontal orientation and a generally vertical orientation, and means for vertically moving the support leg between a third retracted position and a fourth extended position;

said float pad being horizontally extendible and retractible with said beam end relative to said vehicle when in the horizontal orientation to clear ground obstacles;

float pad actuator means connected to said float pad and rotatable therewith;

cam means rotatably connected to said support leg, said cam means having a first cam surface and a second cam surface, said second cam surface bearing against the float pad actuator means operative to rotate the float pad from the horizontal to the vertical orientation upon forced rotation of the cam means against the float pad actuator means; and cam actuator means mounted on the vehicle in position to engage the first cam surface of the cam means as the float pad approaches said horizontally retracted position and said support leg approaches the vertically retracted position, and to bear against the first cam surface to force rotation of the cam means against the float pad actuator means to rotate the float pad to the vertical orientation as the float pad reaches the horizontally retracted position and said support leg reaches the vertically retracted position.

2. The outrigger assembly of claim 1 wherein: said first and second cam surfaces are so related to the cam actuator means and the float pad actuator means such that when said support leg is in the third position and said outrigger beam is in the first position, the float pad commences movement from the vertical orientation toward the horizontal orientation upon commencement of movement of the outrigger beam from the first position toward the second position, and completes movement to the horizontal orientation after a short extension of the outrigger beam toward the second position.

3. The outrigger assembly of claim 1 wherein: said first and second cam surfaces are so related to the cam actuator means and float pad actuator means such that when said support leg is in the third position and said outrigger beam is in the first position, the float pad commences movement from the vertical orientation toward the horizontal orientation upon commencement of movement of the support leg from the third position toward the fourth position, and completes rotation to the horizontal orientation upon a short extension of the support leg toward the fourth position.

4. The outrigger assembly of claim 3 wherein: said first and second cam surfaces are so related to the cam actuator means and the float pad actuator means such that when said support leg is in the third position and said outrigger beam is in the first position, the float pad commences movement from the vertical orientation toward the horizontal orientation upon commencement of movement of the outrigger beam from the first position toward the second position, and completes movement to the horizontal orientation after a short extension of the outrigger beam toward the second position.

5. The outrigger assembly of claim 1 including: an outrigger housing mounted on a vehicle, said outrigger beam being telescopically extendible and retractible relative to said outrigger housing, said cam actuator means being mounted on said outrigger housing.

6. The outrigger assembly of claim 1 wherein: said means for vertically moving said support leg includes a power unit having a vertically extendible and retractible rod comprising said support leg; said float pad being rotatably assembled to said rod.

7. The outrigger assembly of claim 6 wherein: said float pad includes a generally flat, ground engageable base, a pair of side plates extending from the base, and a float pad pivot pin secured between the side plates and rotatably assembled to the rod end; said float pad actuator means including at least one float pad actuator bracket connected to the float pivot pin and having a float pad actuator bar in position to be engaged by the cam means.

8. The outrigger assembly of claim 6 wherein: said power unit includes a hydraulic cylinder, said rod being extendible and retractible relative to said hydraulic cylinder; a guide bar fastened to the lower end of the rod for movement with the rod and extending upwardly into said hydraulic cylinder parallel to said rod and being accommodated in a groove in said hydraulic cylinder to prevent axial rotation of said rod; said cam means being mounted on said guide bar.

9. The outrigger assembly of claim 8 wherein: said float pad actuator means includes a pair of float pad actuator brackets connected to said float pad pivot pin; said cam means including a transverse cam bracket mounted on the guide bar; a cam pivot pin mounted on the transverse cam bracket, and a pair of cam members mounted on the cam pivot pin, each cam member having a first of said cam surfaces and a second of said cam surfaces.

10. The outrigger assembly of claim 9 wherein: said cam actuator means includes a transverse cam actuator bar engageable with the cam surfaces of the cam members.

11. An outrigger assembly for stabilization of a vehicle, including:

an elongate, outrigger beam mounted with respect to a vehicle for horizontal extension and retraction between extended and fully retracted positions relative to the vehicle;

a float assembly on an end of said beam horizontally extendible and retractible therewith;

said float assembly including a power unit having a rod extendible vertically downward and retractible vertically upward relative to the beam end;

a float pad rotatably assembled to the end of the rod being vertically extendible and retractible therewith and rotatable between a generally horizontal, ground engageable orientation and a generally vertical, storage orientation;

said float pad being horizontally extendible and retractible in the horizontal orientation with said beam end relative to the vehicle to clear ground obstacles;

said float pad being positionable in the vertical orientation for storage when the beam end is in the fully horizontally retracted position and when the rod is in a fully vertically retracted position;

cam means having a cam surface and being functionally associated with the float pad for rotation of the fload pad upon rotation of the cam means;

cam actuator means mounted on the vehicle and positioned to contact said cam surface as said beam end approaches a horizontally retracted position with said rod in a vertically retracted position, and positioned to contact said cam surface as said rod approaches a vertically retracted position with said beam end in the horizontally retracted position;

said cam surface contoured to follow the cam actuator means and cause rotation of the float pad from the horizontal to the vertical orientation upon full horizontal retraction of the beam end with the rod in the vertically retracted position and upon full vertical retraction of the rod with the beam end in the fully retracted position whereby the float pad is moved from the horizontal to the vertical storage orientation when the beam end and the rod are fully retracted and moves from the vertical storage orientation to the horizontal orientation upon commencement of extension of said rod.

12. The outrigger assembly of claim 11 including: an outrigger housing mounted on the vehicle, said outrigger beam being telescopically extendible and retractible relative to said outrigger housing, said cam actuator means being mounted on said outrigger housing.

13. The outrigger assembly of claim 11 wherein: said cam means includes a cam member rotatably assembled to said rod and having said cam surface; float pad actuator means connected to said float pad and rotatable therewith; said cam member having a portion in engagement with said float pad actuator means for rotation of the float pad and float pad actuator means upon contact of the cam surface by the cam actuator means to rotate said float pad from the horizontal to the vertical orientation.

* * * * *